United States Patent
Fornof et al.

(10) Patent No.: US 7,608,132 B2
(45) Date of Patent: Oct. 27, 2009

(54) VEHICLE AIR SYSTEM AND METHOD WITH FORCED PURGING

(75) Inventors: William P. Fornof, Girard, PA (US); Paul Reisinger, Lorain, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 609 days.

(21) Appl. No.: 11/361,479

(22) Filed: Feb. 24, 2006

(65) Prior Publication Data

US 2007/0199444 A1    Aug. 30, 2007

(51) Int. Cl.
*B01D 46/46* (2006.01)
(52) U.S. Cl. ............................... 95/23; 95/117; 95/121; 96/108; 96/143; 34/79
(58) Field of Classification Search ............... 95/23, 95/117, 121; 96/108, 143; 34/79
See application file for complete search history.

(56) References Cited

U.S. PATENT DOCUMENTS

| 4,763,959 | A | 8/1988 | Vandemotter |
| 4,936,026 | A | 6/1990 | Cramer et al. |
| 4,941,894 | A | 7/1990 | Black |
| 5,027,529 | A | 7/1991 | Cramer et al. |
| 5,103,576 | A | 4/1992 | Cramer et al. |
| 5,145,495 | A | 9/1992 | Elamin |
| 5,209,764 | A | 5/1993 | Eberling |
| 5,378,266 | A | 1/1995 | Elamin |
| 5,592,754 | A | 1/1997 | Krieder et al. |
| 6,125,553 | A | 10/2000 | Quinn et al. |
| 6,128,825 | A | 10/2000 | Cunkelman |
| 6,640,463 | B1 * | 11/2003 | Beck et al. ............ 34/527 |
| 2006/0196168 | A1 | 9/2006 | Seitz et al. |

* cited by examiner

*Primary Examiner*—Robert A Hopkins
(74) *Attorney, Agent, or Firm*—Calfee, Halter & Griswold LLP

(57) ABSTRACT

A method and apparatus provide multiple consecutive purges of an air dryer in a vehicle compressed air system. A dryer throughput sensor has an output indicative of the amount of compressed air that is passed through the dryer. In response, a CPU determines the number of purges needed to purge the dryer; and a valve is operated by the CPU to initiate multiple purges of the dryer when the compressor is unloaded.

25 Claims, 4 Drawing Sheets

VEHICLE AIR SYSTEM AND METHOD WITH FORCED PURGING

BACKGROUND OF THE INVENTION

A typical vehicle compressed air system, as used for operating air brakes and other devices, for example, includes a compressor that compresses ambient air to fill one or more service reservoirs. Whenever the compressor is loaded and the system is charging (the "charge phase"), compressed air passes through an air dryer and moisture or water is collected by a desiccant in the dryer. Compressed air is also passed through the dryer to a purge reservoir that is connected to the air dryer.

At the end of every charge cycle, the compressor unloads, and the system automatically purges the dryer (the "purge phase") with a flow of air from a purge reservoir located downstream of the air dryer, through a purge orifice and through the dryer. This purge regenerates the desiccant in the air dryer. A single purge is provided, no matter how long the system had been charging, and no matter how much purging might actually be required for dryer regeneration (based on the amount of water in the dryer). If a long charge time is needed to maintain the brake system, a second dryer is used, adding cost and space requirements on the vehicle.

SUMMARY OF THE INVENTION

In one aspect the invention relates to an apparatus for use in a vehicle compressed air system that includes a service reservoir, a service pressure sensor for sensing the need to recharge the service reservoir, a compressor which when loaded supplies compressed air to charge the service reservoir, a dryer for drying the compressed air prior to passing it to the service reservoir, and a purge reservoir for supplying purge air to purge moisture from the dryer. The apparatus includes a sensor having an output indicative of the amount of compressed air that is passed through the dryer; a purge pressure sensor for sensing the need to recharge the purge reservoir; a CPU responsive to the dryer throughput sensor for determining the number of purges needed to purge the dryer; and a valve operable by the CPU to initiate multiple purges of the dryer.

In another aspect the invention relates to a method including the steps of passing compressed air from a compressor through an air dryer into a service reservoir of a vehicle compressed air system, the air dryer removing moisture from the air; and determining the amount of air passed through the dryer.

In another aspect the invention relates to a method including the steps of loading and unloading a compressor in response to a sensed need to recharge the service reservoir of a vehicle compressed air system, the compressed air through an air dryer; purging the air dryer when the compressor is unloaded; and loading the compressor again in response to a further sensed need to recharge the service reservoir. The purging step includes purging the air dryer multiple times prior to performing the step of loading the compressor again.

BRIEF DESCRIPTION OF THE DRAWINGS

The foregoing and other features of the present invention will become apparent to one skilled in the art to which the present invention relates upon consideration of the following description of embodiments of the invention with reference to the accompanying drawings, in which.

DETAILED DESCRIPTION OF EMBODIMENTS OF THE INVENTION

Figure 1:
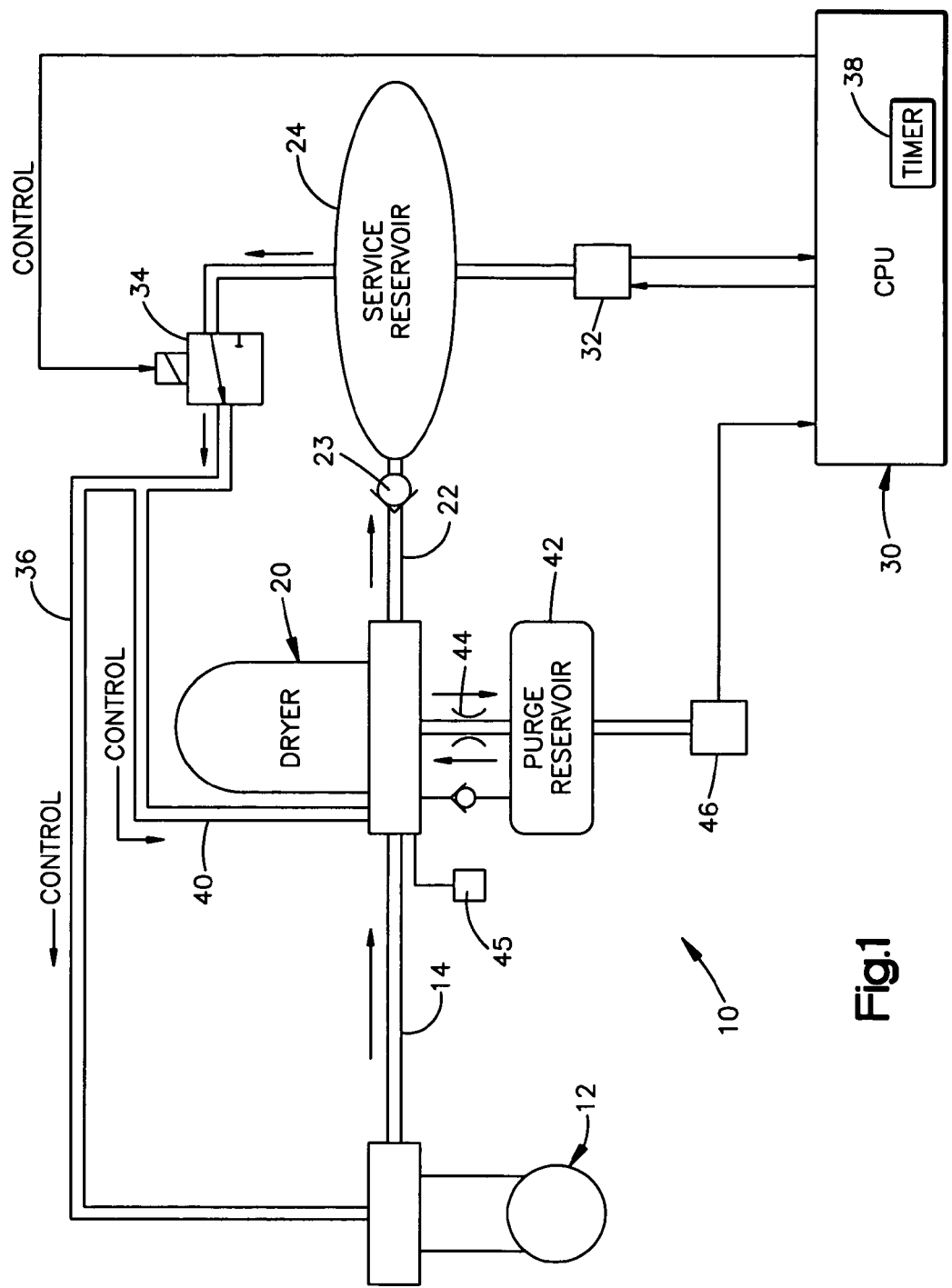
FIG. 1 is a schematic illustration of a first embodiment of the invention that is a system showing aspects of the present invention.
Figure 2:
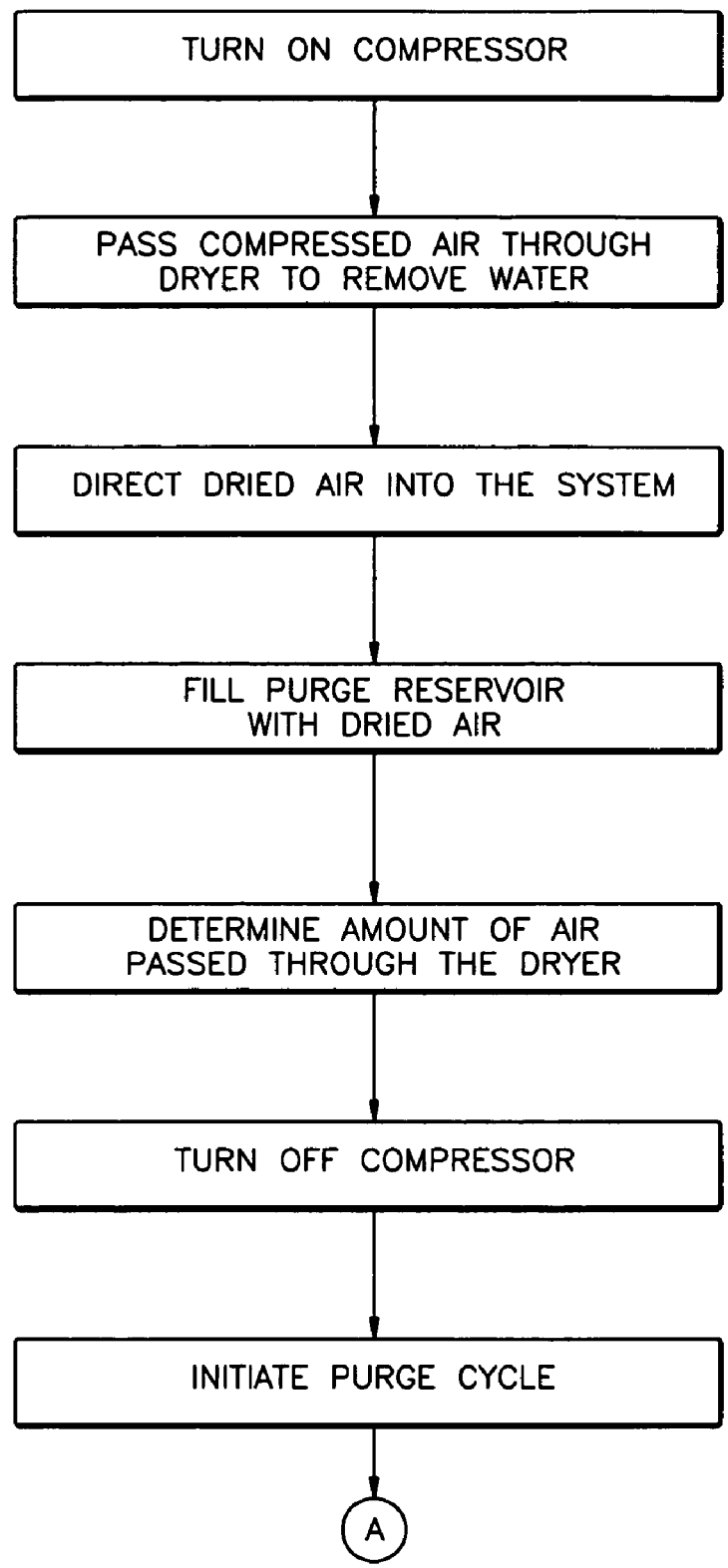
FIG. 2 is a flow chart illustrating partial operation of the system of FIG. 1.
Figure 3:
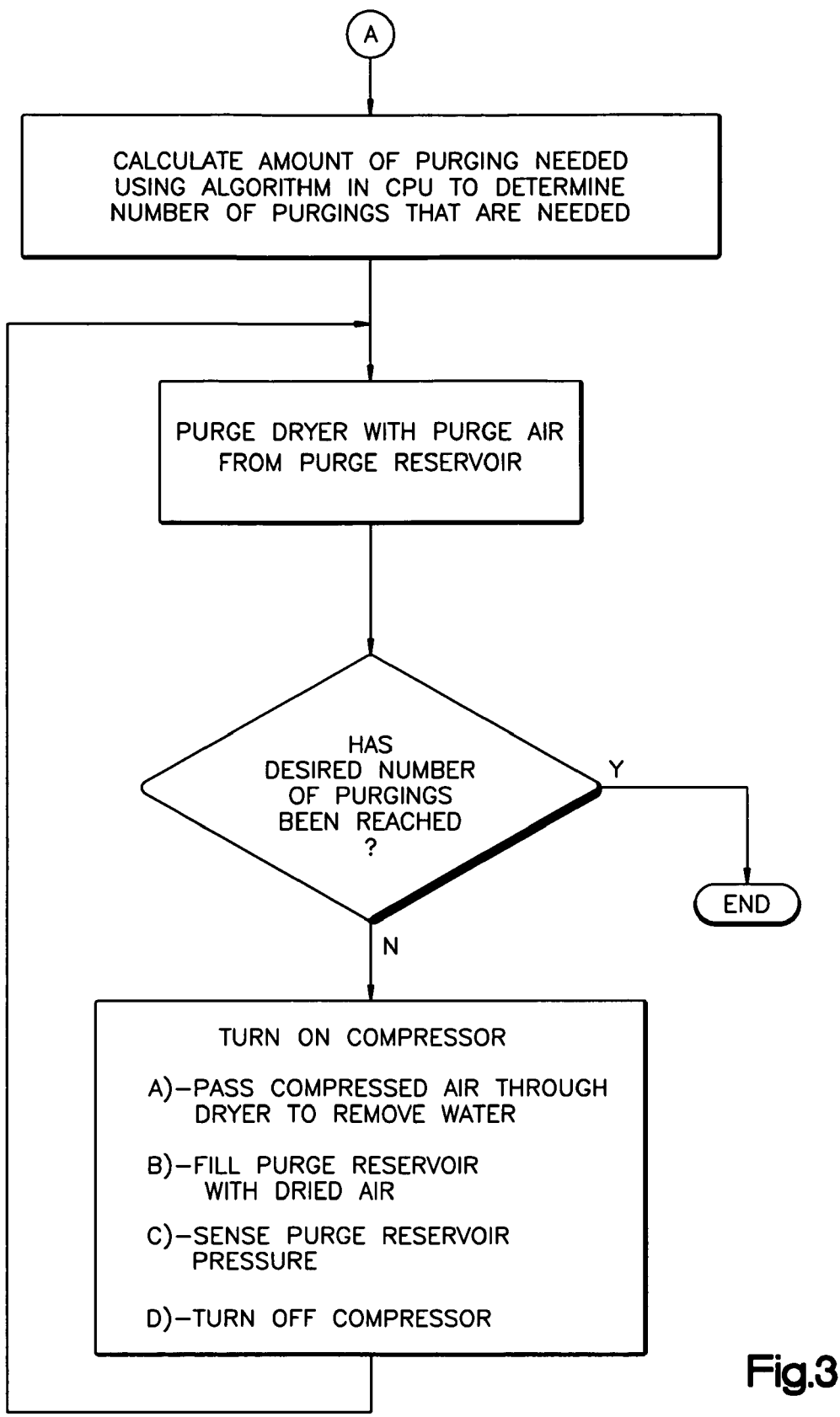
FIG. 3 is a flow chart illustrating additional operation of the system of FIG. 1.

The present invention relates to a vehicle compressed air system. The invention is applicable to systems of varying constructions. As representative of the invention, FIGS. 1-3 illustrate a system 10 and corresponding method that illustrate aspects of the invention.

The system 10 includes a compressor 12 for compressing ambient air. The output of the compressor 12 is directed over a line 14 to an air dryer 20. The air dryer 20 is operative to remove water from the compressed air, for example, by use of a desiccant. The output of the air dryer 20 is directed over a line 22 to one or more service reservoirs indicated at 24 for supplying air to the devices of the system 10, such as brake actuators. A check valve 23 presents reverse flow from reservoirs to the air dryer 20.

Operation of the compressor 12 is controlled by a CPU or controller 30. The CPU 30 receives an input from a pressure sensor 32 that senses pressure in the service reservoir 24. When the sensed pressure drops below a predetermined level, typically 100 psig, the CPU 30 provides an output that operates a solenoid operated valve 34 to direct control air pressure over a line 36 to the compressor 12, to load the compressor. When the pressure in the reservoir 24 is high enough, typically 120 psig, the CPU 30 operates the valve 34 to unload the compressor 12. The CPU 30 also typically includes a loaded mode timer or charge phase timer, as shown schematically at 38. The CPU 30 can be a dedicated purge and compressor device, or can alternatively be a vehicle management CPU or an ABS system CPU.

A purge reservoir 42 is filled with dry air from the dryer 20 when the system 10 is charging as described above. The pressure in the purge reservoir 42 is sensed by a second pressure sensor 46, the output of which is read by the CPU 30. When the compressor 12 is unloaded, the CPU 30 provides, as an output, a control signal over a line 40 to the dryer 20 that causes the dryer to be purged with purge air from the purge reservoir 42, passing through a purge orifice 44. That is, air from the purge reservoir 42 is passed through the air dryer 20 and then expelled to atmosphere through a purge valve 45. Thus, at the end of the typical purge phase, the purge reservoir pressure is approximately equal to atmospheric pressure.

The amount of air that passes through the dryer 20, during the charge phase, is sensed and/or determined. Thus, the system 10 includes a dryer throughput sensor or means or mechanism that can be realized in several different ways. One way is via the timer 38, which senses the amount of time the compressor 12 runs. The running time of the compressor 12 is indicative, or representative, of the amount of compressed air that is passed from the compressor through the air dryer 20. Thus, the timer 38 is a "sensor" for this purpose. Another way is discussed below with reference to FIG. 4.

The amount of air that is passed through the air dryer 20 is indicative, or representative, of the amount of moisture that is collected in the air dryer and that needs to be purged in order to regenerate the desiccant bed. The CPU 30, on the basis of the output of the dryer throughput sensor, makes a determination of the amount of moisture that is present in the dryer 20. For example, this may be by means of an algorithm that is embedded in the CPU 30. The algorithm correlates the amount of moisture in the dryer 20, with the number of purges of the dryer that are needed to remove that moisture. The algorithm may take into account one or more of the following factors, among others: the capacity of the dryer 20, the capacity and pressure of the purge reservoir 42, the time needed for one purge, and the amount of moisture expelled from the desiccant during one purge.

In a known manner, when the compressor 12 is unloaded, the system 10 provides one purge, automatically. The CPU 30 determines whether one or more additional purges is needed over and above the one automatic purge. For example, the algorithm may determine that, based on the particular elapsed time measurement, nine purges are needed to regenerate the air dryer.

The CPU 30, because it controls the solenoid valve 34 that loads and unloads the compressor 12, keeps track of the number of individual purges that are effected during each purge phase. The CPU 30 compares the number of purges that have occurred, with the determined number of purges that are needed to fully dry the desiccant. If the CPU 30 determines that additional purging is needed other than the one automatic purge, the CPU loads the compressor 12. Compressed air from the compressor 12 passes through the dryer 20 and refills the purge reservoir 42 but not the service reservoir 24. When the purge reservoir 42 is determined to be full, as determined by the CPU 30 in response to the reading of the purge pressure sensor 46, the CPU unloads the compressor 12. Since the service reservoir pressure is higher than the purge reservoir pressure, the check valve 23 prevents any air flow to or from the service reservoir.

When the compressor 12 is unloaded, a second purge is forced. Even though this purge air has gone into the purge reservoir 42 through the still wet desiccant, when it is released to purge, it expands via the purge orifice 44, and so it is effective to at least partially dry the desiccant through which it has just recently passed.

The CPU 30 then compares again the number of purges that have occurred, with the determined number of purges that are needed to dry fully the desiccant in the dryer 20. If the CPU 30 determines that additional purging is still needed, the CPU loads the compressor 12 again and fills up the purge reservoir 42 again, then unloads the compressor. Unloading the compressor 12 provides a third purge (a second forced purge).

This cycle of forced purges continues until one of two things happens. First, the CPU 30 has had enough time to force enough purges so as to meet the determined number of purges. In this case, the purge phase is completed before the system 10 as a whole needs to be recharged.

Second, the system pressure (as represented by the pressure in the service reservoir 24 as sensed at 32), decreases to a level at which the system 10 needs to be charged again. In this case, the CPU 30 stops the purge phase and loads the compressor 12 to run until the system 10 is fully charged as before. As this recharging occurs, air passes through the dryer 20 and moisture is collected by the desiccant in the dryer. The CPU 30 makes a determination of how much additional moisture has been added to the dryer 20. This input is used by the CPU 30 to determine how much additional purging is needed, on top of the purging that is still needed from the previous (incomplete) purge cycle. Via the algorithm, the CPU 30 again determines how many purges are now needed. Then, when charging stops again, the purge phase (sequence of forced purges) commences again.

Because the dryer 20 can be purged more than once in each purge phase (that is, following each system charge phase), significantly more water can be removed from the dryer before the next charge phase. This can allow the system 10 to continue functioning properly even when challenged by extended air charge phases. This can allow for use of only a single dryer 20, rather than two dryers, to reduce cost and also to reduce space requirements on the vehicle. With only a single purge, in contrast, the dryer 20 could fill with so much moisture, that moisture would pass into the downstream reservoir and components. With the present invention, between two and fifty, or more, consecutive purges can be provided in the purge phase.

Figure 4:
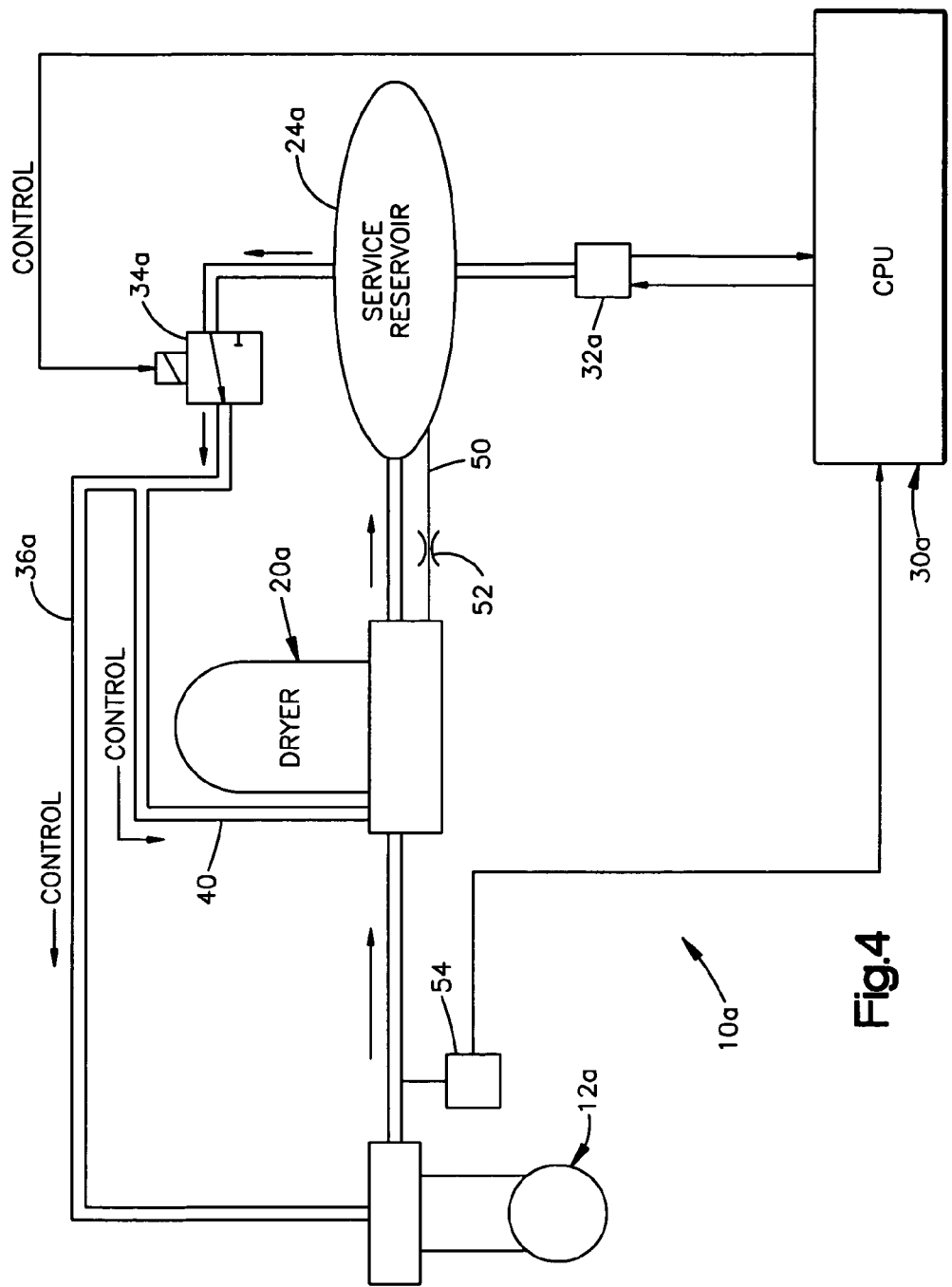
FIG. 4 is a schematic illustration similar to FIG. 1 of a second embodiment of the invention that is a vehicle air system showing aspects of the present invention.

FIG. 4 illustrates an alternative purge system 10a and corresponding method that illustrate aspects of the present invention. The system 10a is generally similar to the system 10 (FIG. 1). In the system 10a (FIG. 4), parts that are the same as or similar to corresponding parts of the system 10 are given the same reference numerals with the suffix "a" added. Several alternatives are shown in FIG. 4. Each one of the alternatives shown in FIG. 4 may be used separately or together, or with the system of FIG. 1.

Specifically, in the system 10a, a separate purge reservoir is not used. Rather, the service reservoir 24a is connected with the dryer 20a by a purge line 50 and a purge orifice 52. When the purge phase is to be initiated, the purge air is supplied to the dryer 20a from the service reservoir.

Also in the system 10a, the amount of air that passes through the dryer 20a is sensed and/or determined in a different manner. Dryer throughput is measured with a meter (that is, a measuring instrument) shown schematically at 54. Specifically, the dryer throughput sensor is realized as, for example, a mass flow meter 54. The meter 54 senses or helps determine more directly the amount of compressed air that passes from the compressor 12a through the air dryer 20a to the reservoir 24a. The output of the mass flow meter 54 is read by the CPU 30a in accordance with the algorithm, to determine how many purges are needed in order to regenerate the desiccant bed of the dryer 20a. Alternatively, the meter 54 could be a device that measures the amount of moisture in the air dryer.

From the above description of the invention, those skilled in the art will perceive improvements, changes, and modifications in the invention. For example, the system could provide multiple purges from each purge volume. Such improvements, changes, and modifications within the skill of the art are intended to be included within the scope of the appended claims.

Having described the invention, we claim:

1. A method comprising the steps of:
    passing compressed air from a compressor through an air dryer into a reservoir of a vehicle compressed air system, the air dryer removing moisture from the air;
    determining the amount of air passed through the dryer by measuring the amount of air with a meter; and
    purging the air dryer, while a pressure in the reservoir is above a predetermined value, as a function of the amount of air passed through the air dryer.

2. A method as set forth in claim 1 wherein the determining step comprises using a timer.

3. A method as set forth in claim 1 further comprising the step of purging the air dryer multiple times in one purge phase, based on the determination of the amount of air passed through the dryer.

4. A method as set forth in claim 3 wherein the air dryer is purged between two and fifty or more consecutive times in one purge phase.

5. A method comprising the steps of:
passing compressed air from a compressor through an air dryer into a reservoir of a vehicle compressed air system, the air dryer removing moisture from the air;
determining the amount of air passed through the dryer;
determining the number of purges of the air dryer that are desired to remove moisture from the air dryer in an electronic processing unit using an algorithm that correlates dryer capacity, air flow through the dryer, and purge capacity, in response to the step of determining the amount of air passed through the dryer; and
purging the air dryer, while a pressure in the reservoir is above a predetermined value, as a function of the amount of air passed through the air dryer.

6. A method comprising the steps of:
loading and unloading a compressor in response to a sensed need to recharge a reservoir of a vehicle compressed air system, the compressed air passing through an air dryer;
purging the air dryer when the compressor is unloaded;
loading the compressor again in response to a further sensed need to recharge the reservoir; and
determining the amount of air passed through the dryer by measuring the air with a meter while the reservoir is being recharged,
said purging step comprising purging the air dryer multiple times before said step of loading the compressor again.

7. A method as set forth in claim 6 wherein the number of purges performed in said purging step is based on the determination of the amount of air passed through the dryer.

8. A method as set forth in claim 7 wherein the air dryer is purged between two and fifty consecutive times.

9. A method comprising the steps of:
loading and unloading a compressor in response to a sensed need to recharge a reservoir of a vehicle compressed air system, the compressed air passing through an air dryer;
purging the air dryer when the compressor is unloaded; and
loading the compressor again in response to a further sensed need to recharge the reservoir;
wherein said purging step comprises purging the air dryer multiple times before said step of loading the compressor again under the control of a CPU.

10. A method as set forth in claim 9 wherein the determining step comprises using a timer.

11. A method comprising the steps of:
loading and unloading a compressor in response to a sensed need to recharge a reservoir of a vehicle compressed air system, the compressed air passing through an air dryer;
purging the air dryer when the compressor is unloaded;
determining the number of purges of the air dryer that are desired to remove moisture from the air dryer, in response to the step of determining the amount of air passed through the dryer; and
loading the compressor again in response to a further sensed need to recharge the reservoir,
wherein the step of determining the number of purges is performed in an electronic processing unit using an algorithm that correlates dryer capacity, air flow through the dryer, and purge capacity.

12. A vehicle compressed air system comprising:
a reservoir;
a pressure sensor for sensing the need to recharge the reservoir;
a compressor for when loaded supplying compressed air to charge the reservoir;
a dryer for drying the compressed air prior to passing it to the reservoir;
a dryer throughput sensor having an output representative of the amount of compressed air that is passed through the dryer;
a purge reservoir for supplying purge air to the dryer;
a purge pressure sensor for sensing the need to recharge the purge reservoir;
a CPU responsive to the dryer throughput sensor for determining the number of purges needed to purge the dryer; and
a valve operable by the CPU to initiate multiple purges of the dryer when the compressor is unloaded.

13. A system as set forth in claim 12 wherein the dryer throughput sensor is a timer.

14. A system as set forth in claim 12 wherein the dryer throughput sensor is a meter that measures the amount of compressed air that passes through the dryer.

15. A system as set forth in claim 12 wherein the CPU embodies an algorithm that correlates dryer capacity, air flow through the dryer, and purge reservoir capacity.

16. A system as set forth in claim 12 wherein the valve is operable by the CPU to initiate between two and fifty consecutive purges of the air dryer.

17. A system as set forth in claim 12 wherein:
the CPU is responsive to the pressure sensor to operate the valve to load the compressor to recharge the reservoir and to unload the compressor to cease charging of the reservoir; and
the valve is operable by the CPU to initiate the multiple purges of the dryer during one purge phase of the system.

18. Apparatus for use in a vehicle compressed air system that includes a reservoir, a pressure sensor for sensing the need to recharge the reservoir, a compressor for when loaded supplying compressed air to charge the reservoir, a dryer for drying the compressed air prior to passing it to the service reservoir, and a purge reservoir for supplying purge air to purge moisture from the dryer, said apparatus comprising:
a dryer throughput sensor having an output indicative of the amount of compressed air that is passed through the dryer;
a purge pressure sensor for sensing the need to recharge the purge reservoir;
a CPU responsive to the dryer throughput sensor for determining the number of purges needed to purge the dryer; and
a valve operable by the CPU to initiate multiple purges of the dryer when the compressor is unloaded.

19. Apparatus as set forth in claim 18 wherein the dryer throughput sensor is a timer.

20. Apparatus as set forth in claim 18 wherein the dryer throughput sensor is a meter that measures the amount of compressed air that passes through the dryer.

21. Apparatus as set forth in claim 18 wherein the CPU includes an algorithm that correlates dryer capacity, air flow through the dryer, and purge reservoir capacity.

22. Apparatus as set forth in claim 18 wherein the valve is operable by the CPU to initiate between two and fifty consecutive purges of the air dryer.

23. A vehicle compressed air system comprising:

a reservoir;

a compressor for when loaded supplying compressed air to charge the reservoir during a charge phase;

a dryer for drying the compressed air prior to passing it to the reservoir;

a purge reservoir for supplying purge air to the dryer during a purge phase; and means for predetermining the number of purges needed in the purge phase based on measuring the air flow through the dryer using a meter.

24. A system as set forth in claim 23 wherein the means for predetermining comprises a timer for measuring the length of the charge phase.

25. A vehicle compressed air system comprising:

a reservoir;

a compressor for when loaded supplying compressed air to charge the reservoir during a charge phase;

a dryer for drying the compressed air prior to passing it to the reservoir;

a purge reservoir for supplying purge air to the dryer during a purge phase; and means for predetermining the number of purges needed in the purge phase using a meter for measuring the amount of moisture in the dryer.

* * * * *

UNITED STATES PATENT AND TRADEMARK OFFICE
CERTIFICATE OF CORRECTION

PATENT NO. : 7,608,132 B2
APPLICATION NO. : 11/361479
DATED : October 27, 2009
INVENTOR(S) : Fornof et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 854 days.

Signed and Sealed this

Twelfth Day of October, 2010

David J. Kappos
*Director of the United States Patent and Trademark Office*